Figure 2:
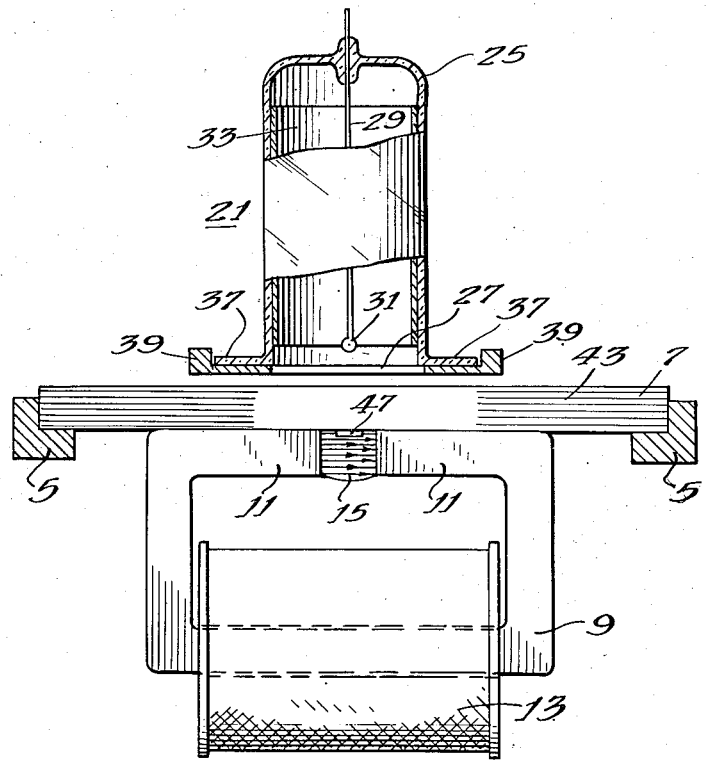

Nov. 13, 1951     D. W. ENGELKEMEIR ET AL     2,574,632
RADIATION DETECTION AND MEASURING APPARATUS AND METHOD
Filed June 8, 1945     2 SHEETS—SHEET 1
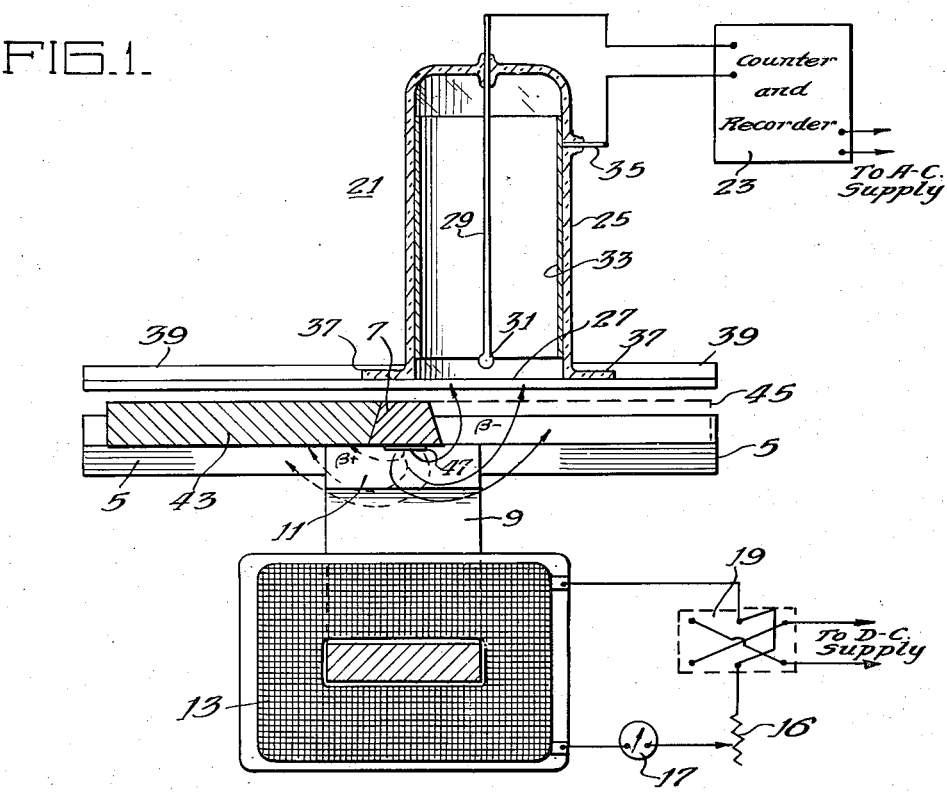
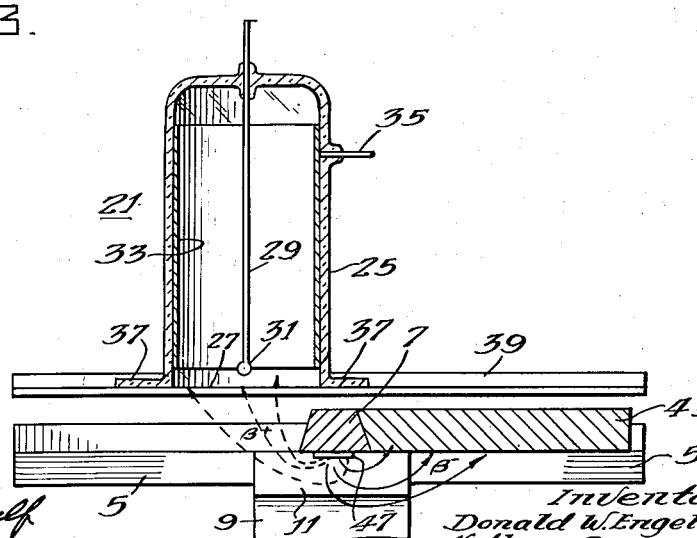

Patented Nov. 13, 1951

2,574,632

UNITED STATES PATENT OFFICE 2,574,632

RADIATION DETECTION AND MEASURING APPARATUS AND METHOD

Donald W. Engelkemeir, Sante Fe, N. Mex., and Nathan Sugarman, Chicago, Ill., assignors to the United States of America as represented by the United States Atomic Energy Commission Application June 8, 1945, Serial No. 598,273

8 Claims. (Cl. 250—83.6)

The present invention relates to apparatus and methods for the detection and measurement of beta particle radiation, and especially to apparatus and methods for separating and measuring the relative amounts of positive and negative beta radiation emitted from radioactive materials or other source of such radiations.

Various radioactive materials emit, during the normal decay thereof, both positive and negative beta particle radiations, these radiation particles being sometimes designated as positrons and electrons, respectively. It is necessary in various physical procedures to measure the relative intensities of these radiations, and it is highly desirable that the means used shall be capable of obtaining comparative intensity readings in the minimum possible interval of time. Heretofore, a completely satisfactory means for this purpose has not been available, and the present invention is concerned with the provision thereof.

A principal object of the invention is to provide a novel improved apparatus and method for the detection and comparative measurement of positive and negative beta particle radiation. More specifically, it is an object of the invention to provide a novel improved apparatus of this character which shall be simple in design and easy to operate, and which, in addition, shall be capable of determining in a very short interval of time the relative amounts of positive and negative beta particle radiation emitted from a single sample of material.

The various novel features and advantages of the invention will be made more apparent by reference to the accompanying drawings and the following description of one preferred embodiment thereof. In the drawings, Fig. 1 is a combined diagrammatic and sectional view of a radiation detection and measuring apparatus in accordance with the invention;

Fig. 2 is a front elevational view partially in section of the apparatus shown in Fig. 1; and Fig. 3 is a sectional view similar to Fig. 1 showing a different operating position of the apparatus.

It has been observed that beta particle radiations, whether from a radioactive source or from some other source, are deflected from the normal straight line path of movement of such particles, following the emission thereof, by a magnetic field, and this principle is embodied into the apparatus and method of the invention. The apparatus includes means for holding a sample of radioactive material in proximity to a strong, uni-directional, magnetic field in such manner that the beta particles emitted by the sample will be directed transversely of such field. The action of the field is such that the positive particles will be deflected in one direction and the negative particles will be deflected in the opposite direction. In other words, separation of the particle radiation is effected by means of this magnetic field. The apparatus also includes means for detecting and measuring the relative intensity of the separated particles, and removable shields which permit the blocking off of either or both types of radiations during the operation of the measuring apparatus.

The specific embodiment of the invention illustrated in Fig. 1 includes an H-shaped, main frame which is constructed of two metallic angle members 5 held in opposed, spaced apart, parallel relationship by a centrally positioned, bar member 7 which should be non-magnetic material. The main frame is supported by any suitable means, not shown. The transversely extending frame member 7 is trapezoidal in cross-section, as illustrated, and it supports the magnet structure utilized to provide the uni-directional magnetic field for deflecting the beta particle radiation during the use of the apparatus.

The magnet structure includes a conventional C-shaped yoke 9 of magnetic material, which is rectangular in cross-section, and which terminates in a pair of spaced apart pole pieces 11 disposed beneath the bar member 7. A coil 13, which comprises a relatively large number of turns of suitable insulated wire, is disposed on the central portion of the yoke 9. The dimensions of the coil 13 are so correlated with reference to the air gap 15 existing between the spaced apart pole pieces 11 that a uni-directional field of sufficient intensity to effect a complete reversal of direction of the beta particles emitted by the sample under test will be effected. To this end, it is desirable that the magnet coil 13 shall be energized from a suitable source of direct current power through a rheostat 16, an ammeter 17, and a reversing switch 19, as illustrated in Fig. 1.

The radiation detection and measuring means utilized may be of any conventional type. Most conveniently, it comprises a Geiger-Müller or other electronic counter and recording system of conventional design which utilizes an ion chamber type exploratory unit 21 having a window constructed of material which is permeable to beta radiations. Since the counter and recorder mechanism is conventional, it is merely indicated at 23 in Fig. 1. The ion chamber 21 is, however, shown in detail in that figure and will be seen to comprise a cylindrical glass envelope 25 which is closed at one end by a thin disk 27 of mica sealed thereto. The ion chamber 21 includes a central electrode 29 which may comprise a small diameter, metallic rod sealed into the glass envelope 25 and extending centrally thereof. The inner end of the central electrode 29 preferably terminates in a spherical ball 31. The other electrode 33 comprises a sleeve of metal or other conducting material applied to the inner surface of the envelope 25, and it is connected to the counter mechanism 23 by means of a terminal 35 sealed into the side wall of the chamber envelope 25.

The window end of the ion chamber envelope 25 terminates in a flange 37, and a pair of spaced-apart, parallel extending, support members 39 are provided for engaging this flange so as to support the ion chamber 21 in position to receive the deflected particle radiation. As will hereinafter appear, the ion chamber 21 is moved to either side of the central transverse frame member 7 during the normal operation of the apparatus, and accordingly, the ion chamber support members 39 extend to both sides of that frame member. The ion chamber support members 39 are, in turn, supported by any suitable means, not shown.

The ion chamber 21 in one satisfactory embodiment of the invention had a diameter of about 1¼ inches and a length of approximately 2 inches. It was sealed and contained argon-ethyl alcohol vapor mixture (10% alcohol) under pressure of about 1/7th atmosphere. This chamber was operated with a potential difference at the electrodes of from 900 to 1100 volts.

The apparatus also includes a pair of removable shield members 43 constructed of sheet aluminum or other material which is impervious to beta particle radiations. These shield members 43 are of such size and proportions that when they are placed on the angle supports 5, as shown in Fig. 1, they will interfit with the transverse support 7 for the magnet structure and will effectively shield the ion chamber 21 from any beta radiation which is deflected to that side of the apparatus where the shield is located. If both shields are in place (the second shield being indicated by the dotted line 45 in Fig. 1), all beta radiations deflected from any sample in proximity to the air gap 15 will be intercepted and blocked by the shields and the reading obtained in the counter apparatus 23 will be restricted to background radiation. It is, of course, essential in the accurate evaluation of the separated positive and negative radiations that the apparatus be capable of measuring background radiations.

During use of the apparatus, a sample 47 of the radioactive material under test is held centrally of the air gap 15 underneath the transverse support member 7 by any suitable holding means. In this position the radioactive material is located at the upper edge of the uni-directional magnetic field which exists between the two pole pieces 11, and the beta radiation emitted by the sample will, in general, be directed downwardly. If the direction of the field is such that the magnetic lines of force are directed outwardly of the paper in Figs. 1 and 3, negative beta particles will be deflected as shown by the curved solid line arrows in those figures, and positive beta particles will be deflected as shown by the curved dotted line arrows in those figures. In other words, the negative particles will be deflected to the right and the positive particles to the left.

The intensity of the field maintained in the air gap 15, as previously stated, is sufficient to reverse the direction of motion of the particles. Under these conditions, with the left hand shield 43 in place, as illustrated in Fig. 1, and the ion chamber 21 located in the position shown in that figure, the counter will produce a measurement which is equal to the combined negative beta radiations and the background. When this determination has been made, the shield 43 in the left hand position may be removed and the similar shield 43 for the right hand side of the apparatus put into position, as illustrated in Fig. 3. Then by moving the ion chamber 21 to the position shown in Fig. 3, it will be possible to obtain a reading which is indicative of the combined positive beta radiation and the background. After these measurements have been obtained, or at some other convenient point in the measurement procedure, both shields 43 should be put in place, and a measurement made of the background radiation. Having these values, it is, of course, a simple matter to subtract the background from the two readings obtained, and to determine the relative intensity of the positive and negative beta radiations.

As an alternative procedure, the entire operation can be carried out without moving the ion chamber 21. This is done simply by beginning with the apparatus shown in Fig. 1, obtaining a measurement of the negative beta radiation with the left hand shield 43 in the position illustrated, then, by operation of the reversing switch 19 obtaining a reading of the positive beta radiation, and finally, placing the right hand shield 43 in the position shown by the dotted lines 45 in Fig. 1, so as to mask the ion chamber 21, and obtaining a background measurement. Each procedure has certain advantages depending upon the particular material under test.

From the foregoing, it will be seen that the apparatus of the invention provides a simple and convenient means for detecting and measuring the relative amounts of positive and negative beta particle radiations emitted from a sample of radioactive material or other source. The apparatus may be easily constructed of commercially available materials, and it requires no unusual skill or training for its operation. The novel features of the apparatus of the invention and the improved measuring procedure are set forth in the accompanying claims.

What is claimed is:

1. Apparatus of the class described comprising support means including a radiation impermeable member having a surface adapted to support a sample of radioactive material, means operable to provide a uni-directional magnetic field across the sample mounting surface of the member, the intensity of said field being such that the direction of the emitted particles will be substantially reversed in direction and positive and negative beta particles emitted from such sample will be deflected in opposite directions, means to detect beta particles, means to mount the detecting means contiguous to the member, said means providing two mounting positions for the radiation detecting means, said mounting positions being on opposite sides of the member and positioned from the member in a direction normal to the magnetic field, and a shield having a movable portion mountable adjacent to the member to shield the detecting means.

2. Apparatus of the class described comprising support means including a radiation impermeable member having a surface adapted to support a sample of radioactive material, an electromagnet having spaced apart pole pieces contiguous to the sample mounting surface of the member, means for producing a uni-directional magnetic field between said spaced apart pole pieces, the intensity of said field being such that the particles emitted from the sample will be substantially reversed in direction and positive and negative beta particles emitted from such sample will be deflected in opposite directions, an ion chamber having two mounting positions, a position on each side of the member at a direction from the member normal to the magnetic field, and shielding means including a movable shield mountable adjacent to the member to shield the ion chamber.

3. Apparatus of the class described comprising a main support which includes a pair of opposed, spaced apart, parallel extending, angle members connected centrally thereof by a transversely extending tie member which is impermeable to beta particle radiation, a pair of spaced apart pole pieces disposed beneath said tie member to create a magnetic field parallel to the tie member, means operable to produce a uni-directional magnetic field between said spaced apart pole pieces, means for supporting a sample of radioactive material beneath said tie member in such position that beta particle radiation therefrom will be directed across the field produced between said pole pieces, the intensity of said field being such that positive and negative beta particles emitted from such sample will be deflected a substantial distance forming two beams diverging to opposite sides of said tie member, and means for separately detecting and measuring said positive and negative beta particle radiation, said radiation detection and measuring means including a radiation detecting element having two mounting positions on said spaced apart angle members, one on each side of the tie member, and a shield supported by the spaced angle members and having two positions, one on each side of the tie member and abutting said tie member.

4. Apparatus of the class described comprising a main support which includes a pair of opposed, spaced apart, parallel extending, angle members connected centrally thereof by a transversely extending tie member which is impermeable to beta particle radiation, an electromagnet having a pair of spaced apart pole pieces disposed beneath said tie member to create a magnetic field parallel to the tie member, means for supporting a sample of radioactive material beneath said tie member in such position that beta particle radiation therefrom will be directed across the field produced between said pole pieces, the intensity of said field being such that positive and negative beta particles emitted from such sample will be deflected upwardly on opposite sides of said tie member, an ion chamber having two mounting positions above said spaced apart angle members, one position on each side of the tie member and in the path of the deflected beta particles, an electronic counter connected to said ion chamber, and a shield supported by the spaced apart angle members and having two positions, one on each side of the tie member and abutting said tie member.

5. The method of separately detecting and measuring positive and negative beta particle radiation from a sample of radioactive material comprising the steps of deflecting the positive and negative beta particles from such a sample in opposite directions by use of a uni-directional magnetic field of sufficient strength to substantially reverse the direction of the particles, shielding one type of particle from a provided detecting and measuring means, and detecting and measuring the other type of particle by such provided detecting and measuring means, reversing the aforesaid employed magnetic field whereby the deflection of the positive and negative beta particles is reversed, and detecting and measuring the said one type of particle while shielding the provided detecting and measuring means from the said other type of particle.

6. Apparatus of the class described comprising a radiation impermeable sample mount, magnet means for inducing a magnetic field adjacent to and below the sample mount of sufficient strength to substantially reverse the direction of the particles, an ion chamber mounted on one side of the mount, an absorber shield laterally abutting against the sample mount on the side of the mount opposite the ion chamber, whereby charged particles emanating from a sample on the sample mount are split into diverging beams, and the absorber shields the detecting means from one of said beams.

7. The apparatus of claim 6 wherein the magnet means is an electromagnet and there is provided in series with the windings thereof a current reversing switch.

8. The method of separately detecting and measuring positive and negative beta particle radiations from a sample of radioactive material which comprises the steps of generating a uni-directional magnetic field across the path of the particles and approximately normal thereto, said field being of sufficient strength to substantially reverse the direction of the particles and said magnetic field separating the particles into two beams, intercepting the one beam of particles with a radiation measuring device after the particles in said beam have substantially reversed their directions, and shielding the other beam from the radiation detecting device.

DONALD W. ENGELKEMEIR.
NATHAN SUGARMAN.

REFERENCES CITED

The following references are of record in the file of this patent:

UNITED STATES PATENTS

| Number | Name | Date |
|---|---|---|
| 2,264,725 | Shoupp et al. | Dec. 2, 1941 |

OTHER REFERENCES

Locket et al., Radiology, vol. 27, 1936, pgs. 149–153.

Rutherford, Radioactive Transformations, Scribner, 1906, pg. 21.

Atomic Physics, Physics Staff, Univ. of Pittsburgh, John Wiley and Sons, 1937, pgs. 266–268.

Procedure in Experimental Physics, Strong Prentice Hall, 1942, pgs. 261 and 262.